US007989398B2

(12) United States Patent
Bland et al.

(10) Patent No.: US 7,989,398 B2
(45) Date of Patent: Aug. 2, 2011

(54) PUMPABLE MULTIPLE PHASE COMPOSITIONS FOR CONTROLLED RELEASE APPLICATIONS DOWNHOLE

(75) Inventors: Ronald G. Bland, Houston, TX (US); Lirio Quintero, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 366 days.

(21) Appl. No.: 12/062,032

(22) Filed: Apr. 3, 2008

(65) Prior Publication Data

US 2008/0182763 A1    Jul. 31, 2008

Related U.S. Application Data

(60) Division of application No. 10/964,085, filed on Oct. 13, 2004, now Pat. No. 7,354,886, which is a continuation-in-part of application No. 10/242,391, filed on Sep. 12, 2002, now abandoned, which is a division of application No. 09/900,798, filed on Jul. 6, 2001, now Pat. No. 6,464,009, which is a division of application No. 09/363,614, filed on Jul. 29, 1999, now Pat. No. 6,284,714.

(51) Int. Cl.
*C09K 8/28* (2006.01)

(52) U.S. Cl. ........ 507/116; 507/110; 507/128; 507/131; 507/133

(58) Field of Classification Search ................. 507/110, 507/116, 128, 131, 133
See application file for complete search history.

(56) References Cited

U.S. PATENT DOCUMENTS

| | | | |
|---|---|---|---|
| 2,038,720 A | | 4/1936 | DeGroote |
| 2,890,169 A | | 6/1959 | Prokop |
| 3,509,951 A | | 5/1970 | Enochs |
| 3,681,240 A | | 8/1972 | Fast et al. |
| 3,977,472 A | | 8/1976 | Graham et al. |
| 4,002,204 A | | 1/1977 | Cavin |
| 4,012,329 A | | 3/1977 | Hayes et al. |
| 4,233,165 A | | 11/1980 | Salathiel et al. |
| 4,352,396 A | | 10/1982 | Friedman |
| 4,500,436 A | * | 2/1985 | Pabley ............................ 507/106 |
| 4,518,511 A | | 5/1985 | Kaufman et al. |
| 4,542,791 A | | 9/1985 | Drake et al. |
| 4,964,468 A | | 10/1990 | Adams et al. |
| 5,189,012 A | | 2/1993 | Patel et al. |
| 5,476,144 A | | 12/1995 | Nahm et al. |
| 5,902,227 A | | 5/1999 | Rivas |
| 5,942,216 A | | 8/1999 | Herb et al. |
| 5,985,177 A | | 11/1999 | Yoshida et al. |
| 5,993,851 A | * | 11/1999 | Foldvari ........................ 424/450 |
| 6,194,354 B1 | * | 2/2001 | Hatchman ..................... 507/134 |
| 6,414,139 B1 | | 7/2002 | Unger et al. |
| 6,509,301 B1 | | 1/2003 | Vollmer |
| 6,613,720 B1 | | 9/2003 | Feraud et al. |
| 7,151,077 B2 | | 12/2006 | Prud'homme et al. |
| 7,219,731 B2 | | 5/2007 | Sullivan et al. |
| 7,220,709 B1 | | 5/2007 | Qu et al. |

FOREIGN PATENT DOCUMENTS

| GB | 2022653 A | 12/1979 |
|---|---|---|
| GB | 2325478 A | 11/1998 |

OTHER PUBLICATIONS

S. Matsumoto, "Interactions Between the Dispersed Globules of W/O/W Emulsions in Existence of Proteins and Saccharides," 10th Int'l. Symposium on Surfactants in Solution, Caracas, Venezuela, Jun. 30, 1994, pp. 295-296.
C. Py, et al. "Investigations of Water/Oil/Water Multiple Emulsions for Cosmetic Applications," 10th Int'l Symposium on Surfactants in Solution, Caracas, Venezuela, Jun. 30, 1994, p. 297.
A. Cardenas, et al. "An Experimental Method to Collect Data on the Controlled Release Capacity of a Multiple Emulsion," 10th Int'l. Symposium on Surfactants in Solution, Caracas, Venezuela, Jun. 30, 1994, p. 299.
M. Briceno, et al. "Water Diffusion Induced by Osmotic Pressure Gradients in Multiple W/O/W Bitumen-in-Water Emulsions," 10th Int'l. Symposium on Surfactants in Solution, Caracas, Venezuela, Jun. 30, 1994, p. 301.
Webster's II New College Dictionary, p. 235 (1995).
N. Garti, et al., "Double Emulsions: Progress and Applications", Current Opinion in Colloid & Interface Science, vol. 3, No. 6, Dec. 1998, pp. 657-667.
B. M. Discher, et al., "Polymer Vesicles in Various Media", Current Opinion in Colloid & Interface Science, 5 (2000), pp. 125-131.

* cited by examiner

*Primary Examiner* — Margaret G Moore
(74) *Attorney, Agent, or Firm* — Mossman Kumar & Tyler PC

(57) ABSTRACT

Pumpable multiple phase vesicle compositions carry agents and components downhole or through a conduit, and controllably releasing them at a different place and time by breaking the compositions. In one non-limiting embodiment the pumpable multiple phase vesicles have a third phase containing a first phase which bears the agent to be controllably released. The first and third phases of the vesicles are separated by a surface active material bilayer that forms the second phase. The pumpable multiple phase vesicles may have internal and external phases that are both oil miscible, both aqueous miscible, or both alcohol miscible. The surface active material bilayer may be composed of compounds such as phospholipids, alkyl polyglycosides, gemini surfactants, sorbitan monooleate, sorbitan trioleate, and many others. The agent may be released by one or more of a variety of mechanisms.

4 Claims, No Drawings

PUMPABLE MULTIPLE PHASE COMPOSITIONS FOR CONTROLLED RELEASE APPLICATIONS DOWNHOLE

CROSS-REFRENCES TO RELATED APPLICATIONS

This application is a divisional application of U.S. patent application Ser. No. 10/964,085 filed Oct. 13, 2004, that issued Apr. 8, 2008 as U.S. Pat. No. 7,354,886, which is a continuation-in-part application of U.S. patent application Ser.No. 10/242,391 filed Sep. 12, 2002, abandoned, which is a divisional of U.S. patent application Ser. No. 09/900,798, filed Jul. 6, 2001, that issued Oct. 15, 2002 as U.S. Pat. No. 6,464,009 B1, which in turn was a divisional of application Ser. No. 09/363,614 filed Jul. 29, 1999, that issued Sep. 4, 2001 as U.S. Pat. No. 6,284,714 B1.

FIELD OF THE INVENTION

The present invention relates to methods and compositions for the controlled release of agents and components downhole in a hydrocarbon recovery or hydrocarbon delivery operation, and more particularly relates, in one embodiment, to multiple phase compositions for the controlled release of agents and components downhole.

BACKGROUND OF THE INVENTION

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds". The drilling fluid is expected to carry cuttings up from beneath the bit, transport them up the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated and also often to form a thin, low permeability filter cake which temporarily seals pores, other openings and formations penetrated by the bit. The drilling fluid may also be used to collect and interpret information available from drill cuttings, cores and electrical logs. It will be appreciated that within the scope of the claimed invention herein, the term "drilling fluid" also encompasses "drill-in fluids" and "completion fluids".

Drilling fluids are typically classified according to their base fluid. In water-based muds, solid particles are suspended in water or brine. Oil can be emulsified in the water. Nonetheless, the water is the continuous phase. Oil-based muds are the opposite or inverse. Solid particles are suspended in oil, and water or brine is emulsified in the oil and therefore the oil is the continuous phase. Oil-based muds that are water-in-oil emulsions are also called invert emulsions. Brine-based drilling fluids, of course are a water-based mud in which the aqueous component is brine.

It is apparent to those selecting or using a drilling fluid for oil and/or gas exploration that an essential component of a selected fluid is that it be properly balanced to achieve the necessary characteristics for the specific end application. Because drilling fluids are called upon to perform a number of tasks simultaneously, this desirable balance is not always easy to achieve.

It would be desirable if compositions and methods could be devised to aid and improve the ability of drilling fluids to accomplish these tasks by delivering agents and components downhole, which could be released controllably to accomplish one or more jobs.

SUMMARY OF THE INVENTION

Accordingly, it is an object of the present invention to provide a method and composition for delivering an agent downhole in hydrocarbon recovery operations, particularly during a drilling and/or completion operation.

It is another object of the present invention to provide a method and composition for delivering an agent downhole where the agent is released at a controlled time and place.

In carrying out these and other objects of the invention, there is provided, in one non-limiting form, pumpable multiple phase vesicles for carrying an agent, where the vesicles include a first phase and a surface active material as the second phase that is capable of partitioning the first phase when dispersed in a medium miscible with the first phase (the third phase) by forming a bilayer membrane. The agent may be identical with or present in a phase, where the phase can be the first phase, the second phase, or both phases. In another non-limiting embodiment of the invention the agent is not the same as the phase, but is a separate, discrete material present within the phase.

Additionally, there is provided in another non-limiting embodiment of the invention, a method for releasing an agent at a remote location in a conduit that involves forming pumpable multiple phase vesicles for carrying an agent, where the vesicles include a first phase and a surface active material as the second phase that is capable of partitioning the first phase when dispersed in a medium miscible with the first phase (the third phase) by forming a bilayer membrane. The agent is identical with or present in either the first phase, the second phase, or both phases. The pumpable multiple phase vesicles may be formed by any of the common methods known to those skilled in the art including emulsifying the first phase into the second phase and dispersing that emulsion into a carrier fluid miscible with the first phase (the third phase). The pumpable multiple phase composition is transported in a conduit, and the agent is released from the multiple phase vesicles at a location remote from the injecting.

DETAILED DESCRIPTION OF THE INVENTION

Pumpable multiple phase compositions are anticipated as being useful to organize a liquid phase to isolate one miscible phase from another. An oil-based vesicle could be used in an invert emulsion, hydrocarbon-based or ester-based or other water immiscible, non-aqueous-based system, while a water-based vesicle could be used in an aqueous system. In another non-limiting embodiment of the invention, alcohol-based vesicles could be used in hydrocarbon-based or other water immiscible, non-aqueous-based systems, or in aqueous systems, depending upon the particulars of the vesicle design. In short, the multiple phase compositions of this invention and methods for their use may be applied to any two miscible phases such that one phase (the first phase) can be partitioned and isolated from the other phase (the third phase) by the use of a surface active material bilayer membrane (the second phase). The phases need not be "oil" or "water", although such phases are likely to be the most common implementation. One non-limiting example is the combination of a water soluble, relatively low molecular weight glycol that forms an emulsion with brine. The vesicles of this invention may also be termed liposomes.

One important application of this kind of organization would be the controlled release of the internal phase and/or the internal phase contents, such as an agent at least within the innermost (first) phase. A non-limiting example of such an application would be the inclusion of, for instance, polyglycols, polyglycol ethers, potassium salts, aluminum salts, calcium salts, silicate salts, chelates, amines, alkanolamines, alkanolamides, amphoteric compounds, or other shale stabilizer and mixtures thereof, alone if liquid or in solution, as a first, internal phase in an aqueous or hydrophilic carrier such as a water-based drilling fluid (third phase) separated by a surface active material bilayer membrane (the second phase). The polyglycols, potassium salts, aluminum salts, calcium salts, silicate salts, chelates, amines, alkanolamines, alkanolamides, amphoteric compounds, and mixtures thereof, alone if liquid or in solution, e.g., may be completely or partially isolated from the water in the external phase of a water-based drilling fluid by the surface active material bilayer membrane.

Dilution is prevented, suppressed, or delayed until the surface active material bilayer membrane is broken intentionally. A likely area for breakage of the emulsion is the high shear environment of and below the drilling bit, where the shale stabilizer or other agent is released to the borehole and cuttings in concentrated form on a localized basis. While the invention does not contemplate, as one non-limiting embodiment, making the multiple phase vesicles so stable that they are not broken in a drilling fluid or completion fluid application, such stable multiple phase vesicles are anticipated and may find utility. It may be noted that the high shear conditions used in making the compositions of this invention are at surface pressures and temperatures, and that downhole temperatures and pressures will be higher. Further, it is expected that in some high shear applications vesicles may be created at the same time others are broken to maintain a pseudo-steady state, or in some cases an increase in vesicle content. It will also be understood in the context of this invention that the internal phase or first phase may be the same as or co-extensive with the agent or the product being delivered.

Of course, emulsifiers, viscosifiers, or other structural stabilizers may also be added to increase the mechanical stability of the pumpable vesicles in some cases to delay release of the contents (agent).

In more detail, the agent to be delivered as the contents of the internal phase or the first phase, may be any conventional agent, including, but not necessarily limited to, shale stabilizers, filtration control additives, viscosifiers, suspending agents, dispersants, thinners, anti-balling additives, lubricants, wetting agents, seepage control additives, lost circulation additives, drilling enhancers, penetration rate enhancers, corrosion inhibitors, scavengers, catalysts, acids, bases, solvents, gelling agents, buffers, cross-linkers, and mixtures thereof. Specific useful shale stabilizers include, but are not necessarily limited to, polyglycols, polyglycol ethers, potassium salts, aluminum salts, calcium salts, silicate salts, chelates, amines, alkanolamines, alkanolamides, amphoteric compounds, and mixtures thereof, alone if liquid or in aqueous solutions, and mixtures thereof. Some other specific agents include, but are not limited to, amines (failing quartz bonds in certain sands, corrosion inhibitors in clay bases systems, shale stabilizers) and metal halides, e.g. aluminum and thorium halides. The term "acids" in the context of this invention include organic acids and inorganic acids. Such acids can be used to treat cement contamination. If appropriate or desirable, the agent may be in aqueous or hydrocarbon solution. In some non-limiting embodiments, the agent to be delivered may be in both the first phase and the second phase, and in identical or different concentrations. Such a system could provide a two-stage delivery of the agent.

The first or internal phase should be soluble in the external or continuous phase (the third phase). Thus, if the continuous phase (third phase) is an aqueous fluid, the first, internal phase should be aqueous; if the continuous phase (third phase) is non-aqueous or hydrophobic, the first, internal phase should be non-aqueous or hydrophobic.

It may be necessary or desirable to add emulsifiers, viscosifiers, stabilizers, and mixtures thereof as structural stabilizers to increase the mechanical stability of the surface active material bilayer membrane to aid in delaying release or breaking of the surface active material bilayer membrane. Alternatively polymerizable surface active materials may be used to form the bilayer membranes followed by polymerization to stabilize the vesicles. Polymerization of the tail portion of the molecule adds stability to the vesicles. In the context of this invention, emulsifiers should be understood to include, but are not limited to, surfactants and the like, and viscosifiers are understood to include, but are not limited to, gelling agents and the like. The emulsifiers and viscosifiers may be in liquid or solid (e.g. powder) form. Suitable emulsifiers include, but are not necessarily limited to, sorbitan fatty acid esters including phospholipids, alkyl polyglycosides, gemini surfactants, sorbitan monooleate, sorbitan trioleate, glycerol fatty acid esters including mono- and/or dioleates, polyglycerol fatty acid esters, polyglycols, alkanolamines and alkanolamides such as ethoxylated amines, ethoxylated amides, ethoxylated alkanolamides, including non-ethoxylated ethanolamides and diethanolamides, and the like as well as block copolymers, terpolymers and the like. Viscosifiers and gelling agents include, but are not necessarily limited to, polymers of ethylene, propylene, butylenes, butadiene, styrene, vinyltoluene, and various copolymers and terpolymers thereof, organophilic clays, aluminum soaps and alkoxides and other aluminum salts, alkaline earth soaps, lithium soaps, fumed silica and alumina and the like and mixtures thereof. Other suitable stabilizers include, but are not necessarily limited to, cholesterol and long chain oil soluble waxy alcohols, and the like. These structural stabilizers may be added directly to the second phase prior to addition of the first phase, directly to the first and second phase emulsion, or they may be added to the fully formed multiple phase vesicle system, if that is more convenient. In one non-limiting embodiment of the invention, the proportion of structural stabilizer based on the total of the first and second phases, prior to injection into a fluid for transport (the third phase), ranges from about 0.1 to about 90 vol. %, in another non-limiting embodiment from about 1 to about 50 vol. %.

Materials suitable to form the surface active material bilayers include, but are not necessarily limited to phospholipids, alkyl polyglycosides, gemini surfactants, sorbitan monooleate, sorbitan trioleate, glycerol fatty acid esters including mono- and/or dioleates, polyglycerol fatty acid esters, polyglycols, alkanolamines and alkanolamides such as ethoxylated amines, ethoxylated amides, ethoxylated alkanolamides, including non-ethoxylated ethanolamides and diethanolamides, and the like as well as block copolymers, terpolymers and the like, and other polymerizable surface active materials, surfactants, viscosifiers, gelling agents, emulsifiers and the like that can exist as bilayers in aqueous solutions. The hydrophobic portion, that is, the hydrocarbon tails, are shielded in the middle of these bilayers. The hydrophilic portion is exposed on both sides (opposite sides of the respective bilayers) to water. While surface active material bilayers are more commonly seen in aqueous systems, they are also found in non-aqueous systems where two miscible oil or non-aqueous phases are separated by a surface active material bilayer in which the molecules are arranged oppositely from that described above, i.e. where hydrophobic portions or tails are exposed on both sides of the layer, while the hydrophilic heads are shielded together in the middle or center of the bilayer.

Forming vesicles using surface active material bilayers can require special but known techniques involving relatively high shear mixing and long shear times, as well as relatively high applications of energy. In one non-limiting embodiment of the invention, when sorbitan monooleate (SMO) is used to form the surface active material surface active material bilayers, it is difficult to get the SMO into an aqueous fluid. Optionally, a carrier may be used to help introduce the surface active material bilayer compound into the fluid. While SMO can form a surface active material bilayer by itself, generally more time and energy are required than when a carrier is used. Suitable carriers for SMO include, but are not necessarily limited to ethoxylated alcohols and polyalkyleneglycols. It is expected that the carrier may be specific to the surface active material bilayer compound to some extent. The vesicle shape may include, but is not limited to, spherical, ovoid, elongated, cylindrical, lamellar, onion layered, worm-like, ribbons, hexagonal rods and mixtures thereof.

Vesicles have several advantages over multiple emulsions. The lack of appreciable amounts of an immiscible intermediate (second) carrier phase of different density helps prevent gravity separation of the final multiphase system. Leaving out the second phase carrier fluid maximizes the viscosity/consistency of the surface active material bilayer membrane and helps stabilize the membrane. Leaving out the second phase carrier fluid also minimizes the amount of "inert" material in a product, which can add to the storage and shipping costs of that product undesirably. Indeed, an important advantage of vesicles in many embodiments is the increased stability of the product and/or liquid they exist in.

However, the pumpable multiple phase compositions of the invention are designed to be broken in a preferred embodiment. That is, the internal phase or first phase which contains an agent or is the agent itself is released or delivered from within the surface active material bilayer. Indeed, the vesicles are desirably and controllably broken within a certain area of the borehole at designated and relatively controlled time.

The preparation of the vesicles would typically involve the mixing of the first phase with the second phase, in the presence of the surface active material bilayer material, where any emulsifier or structural stabilizer might also be present. Alternatively, one liquid may be used which contains the surface active material bilayer compound, with or without a structural stabilizer. The speed of stirring or mixing of the two phases would depend upon the desired size of the vesicles, and the particular system used. It is expected that the size of the first phase vesicles would range from about 0.01 to about 1000 microns or less, in another non-limiting embodiment, from about 1 to about 100 microns or less, as non-limiting examples. In one non-limiting embodiment of the invention, the vesicles would be as large as is practical. The proportion of first, internal phase to the overall pumpable composition may range from about 90 to about 5 vol. % or less, preferably from about 60 to about 40 vol. % or less, and most preferably, 50 vol. % or less, as non-limiting examples. A lower threshold of 1 vol. % may be appropriate in some embodiments of the invention.

The pumpable vesicles are suspended in the drilling and/or completion fluid (the third phase). If the third phase is non-aqueous, in one non-restrictive embodiment, the phase may, in some non-limiting embodiments, be a synthetic material, and, for instance, may include, but is not necessarily limited to, esters, iso-olefins, alpha-olefins, polyolefins, poly (alpha-olefins), paraffins, Fischer-Tropsch reaction products, and the like. The non-aqueous phase may be a mixture or blend of petroleum distillates and synthetic hydrocarbons. Suitable petroleum distillates include, but are not limited to, diesel oil, kerosene, mineral oils, food grade mineral oils, paraffinic oils, cycloparaffinic oils, aromatic oils, or n-paraffins, isoparaffins and similar hydrocarbons. Crude oil could be used in some cases. In the case where the third phase is an oil-based phase, it is anticipated that any of these hydrocarbons may be used.

In the case where first and third miscible phases are aqueous, the aqueous phases may be brine. Careful adjustment of the internal phase salinity may be required (osmotic pressure gradient adjustment). Too much salt or too low an activity in a first aqueous phase may make the vesicles unstable. However, this mechanism may be intentionally used to cause failure or rupture of the vesicles or liposomes downhole. For example, the droplets could be designed to grow on the journey downhole and break at or near the desired zone.

As noted, it is expected that the size of the vesicles of the first phase in the third phase would range from about 1000 to about 0.01 micron or less, in one non-restrictive embodiment from about 100 to about 1 microns or less, as non-limiting examples. In one embodiment of the invention, the pumpable vesicles would be as large as possible. The larger the first phase vesicles in the second phase, all things being equal, the easier it would be to break the surface active material bilayers to release the agents and/or contents from the first phase.

The proportions of the vesicles in the second phase as a product completion fluid (additional second phase) may range from about 0.5 to about 90 vol. %. Alternatively the lower limit of this range may be about 1 vol. % or about 2 vol. %, while the upper limit of this range may be about 40 vol. %, in one non-limiting embodiment about 10 vol. %, in another embodiment up to about 5 vol. %, and in still another non-restrictive embodiment up to about 6 vol. %, as non-limiting examples, to make the overall pumpable multiple phase composition.

Conventional drilling and/or completion fluid additives may, of course, be employed, including, but not necessarily limited to, wetting agents, viscosifiers, suspending agents, weighting agents, shale stabilizers, filtration control additives, anti-balling additives, lubricants, seepage control additives, thinners, lost circulation additives, corrosion inhibitors, alkalinity control additives, dispersants, and the like. Indeed, the agents to be delivered by the multiple phase compositions and methods herein may also be present in the second phase.

The method of this invention may find particular usefulness in increasing the local concentration of an agent downhole after rupture of the surface active material bilayers while keeping the overall concentration of the agent in the drilling mud (including the entire multiple phase composition) low. For example, styrene-butadiene rubber (SBR), useful as a viscosifier and/or filtration control additive, could be the agent in the first phase of the vesicles and be in relatively low concentrations overall. However, once the surface active material bilayers of the vesicles are broken or caused to fail, the local concentration of SBR at the vesicle failure zone would be relatively increased.

Using the pumpable multiple phase composition of the inventions is straightforward and requires no special equipment. The vesicles are injected into a fluid that is pumped downhole. The fluid may be a drilling fluid, drill-in fluid, a completion fluid or the like. In one non-restrictive embodiment of the invention, the fluid is a drilling fluid or drill-in fluid. A number of mechanisms could be used to break the pumpable multiple phase composition at a particular time, including, but not necessarily limited to, a change in energy input, e.g. a change in temperature, a change in pressure, an increase in shear stress, an increase in shear rate, mechanical action (e.g. a rotating drill bit or drill string), a change in pH, a change in electrical potential, a change in magnetic flux, solvent thinning, presence of a chemical agent, presence of a catalyst, and the like, and combinations thereof. A non-limiting, but preferred method is breaking the multiple phase composition by subjecting it to a high shear environment, in particular the fluid stream exiting a nozzle impinging on the borehole such as below a bit or opposite a reamer or hole opener. In a preferred method of the invention, the surface active material bilayers are broken within a required period of time, and within a required physical volume. In another non-limiting embodiment, if the agent being delivered was a shale stabilizer, the shale stabilizer could be delivered essentially instantaneously to the borehole and cuttings in a concentrated form on a localized basis.

It would also be understood that more than one agent may be delivered downhole, and that two or more agents may interact or react with each other to provide a beneficial effect. For example, crosslinkers could be transported in a first vesicle product in the same aqueous third phase as a second vesicle product containing the agent to be cross-linked.

The agent may also be a polymer serving any of the stated functions, or a monomer to be polymerized or in the course of being polymerized to such a polymer.

Further, the multiple phase compositions of this invention are not limited to utility in downhole applications, but could be used to deliver and transport agents along a pipeline or other conduit, such as agents to prevent blockages (e.g. caused by asphaltenes, hydrates, etc.) in a subsea pipeline or the like, or other agents. Any of the agents previously mentioned may be used in this way, and suitable agents may additionally include, but are not limited to, hydrate inhibitors, asphaltene inhibitors, scale inhibitors, etc.

In the foregoing specification, the invention has been described with reference to specific embodiments thereof, and has been suggested as effective in providing pumpable, multiple phase compositions which can effectively carry agents and components downhole for controlled release in space and time. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of phases, agents, surface active material bilayers, structural stabilizers, etc. and proportions thereof falling within the claimed parameters, but not specifically identified or tried in a particular composition to improve the delivery of agents and components herein, are anticipated to be within the scope of this invention.

We claim:

1. Pumpable multiple phase vesicles carrying an oil field agent comprising:
    a first phase;
    a third phase which is an external phase selected from the group consisting of a drilling mud, a drill-in fluid, and a completion fluid; and
    a surface active material bilayer second phase separating the first phase from the third phase, where the surface active material bilayer is selected from the group consisting of phospholipids, alkyl polyglycosides, gemini surfactants, glycerol fatty acid esters including mono- and/or dioleates, polyglycerol fatty acid esters, ethoxylated amines, ethoxylated amides, and mixtures thereof, capable of forming a bilayer;
    where the oil field agent is identical with or present in a phase selected from the group consisting of the first phase, the third phase, and both phases, and where the agent is selected from the group consisting of:
        shale stabilizers selected from the group consisting of polyglycols, polyglycol ethers, potassium salts, aluminum salts, calcium salts, silicate salts, chelates, amphoteric compounds, and mixtures thereof, alone if liquid or in solution,
        filtration control additives,
        suspending agents,
        dispersants,
        thinners,
        anti-balling additives,
        seepage control additives,
        lost circulation additives,
        drilling enhancers,
        penetration rate enhancers,
        corrosion inhibitors,
        scavengers,
        gelling agents,
        buffers,
        cross-linkers for an agent to be cross-linked, and
        mixtures thereof.

2. The pumpable multiple phase vesicles of claim 1 where the first phase and third phase are miscible and are selected from the group of miscible phases consisting of oil phases, aqueous phases, and alcoholic phases.

3. Pumpable multiple phase vesicles carrying an oil field agent comprising:
    a first, internal phase;
    a third, external phase selected from the group consisting of a drilling mud, a drill-in fluid, and a completion fluid; and
    a surface active material bilayer second phase separating the first phase from the third phase, where the surface active material bilayer is selected from the group consisting of phospholipids, alkyl polyglycosides, gemini surfactants, glycerol fatty acid esters including mono- and/or dioleates, polyglycerol fatty acid esters, ethoxylated amines, ethoxylated amides, and mixtures thereof, capable of forming a bilayer;
    where the oil field agent is identical with or present in a phase selected from the group consisting of the first phase, the second phase, and both phases, and where the first phase and third phase are miscible and are selected from the group of miscible phases consisting of oil phases, aqueous phases, and alcoholic phases, and where the agent is selected from the group consisting of:
        shale stabilizers selected from the group consisting of polyglycols, polyglycol ethers, potassium salts, aluminum salts, calcium salts, silicate salts, chelates, amphoteric compounds, and mixtures thereof, alone if liquid or in solution,
        filtration control additives,
        suspending agents,
        dispersants,
        thinners,
        anti-balling additives,
        seepage control additives,
        lost circulation additives,
        drilling enhancers,
        penetration rate enhancers, corrosion inhibitors,
scavengers,
gelling agents,
buffers,
cross-linkers for an agent to be cross-linked, and
mixtures thereof.

4. Pumpable multiple phase vesicles carrying a shale stabilizer agent comprising:
a first, internal phase;
a third, external phase, where the first phase and the third phase are miscible and are selected from the group of miscible phases consisting of oil phases and alcoholic phases; and
a surface active material bilayer second phase separating the first phase from the third phase, where the surface active material bilayer is selected from the group consisting of phospholipids, alkyl polyglycosides, gemini surfactants, glycerol fatty acid esters including mono- and/or dioleates, polyglycerol fatty acid esters, ethoxylated amines, ethoxylated amides, and mixtures thereof, capable of forming a bilayer;
where the shale stabilizer agent is identical with or present in a phase selected from the group consisting of the first phase, the third phase, and both phases and is selected from the group consisting of polyglycols, polyglycol ethers, potassium salts, aluminum salts, silicate salts, chelates, and mixtures thereof, alone if liquid or in solution.

* * * * *